July 28, 1959
I. BENCOWITZ
2,897,150
PURIFICATION OF WATER
Filed July 11, 1957
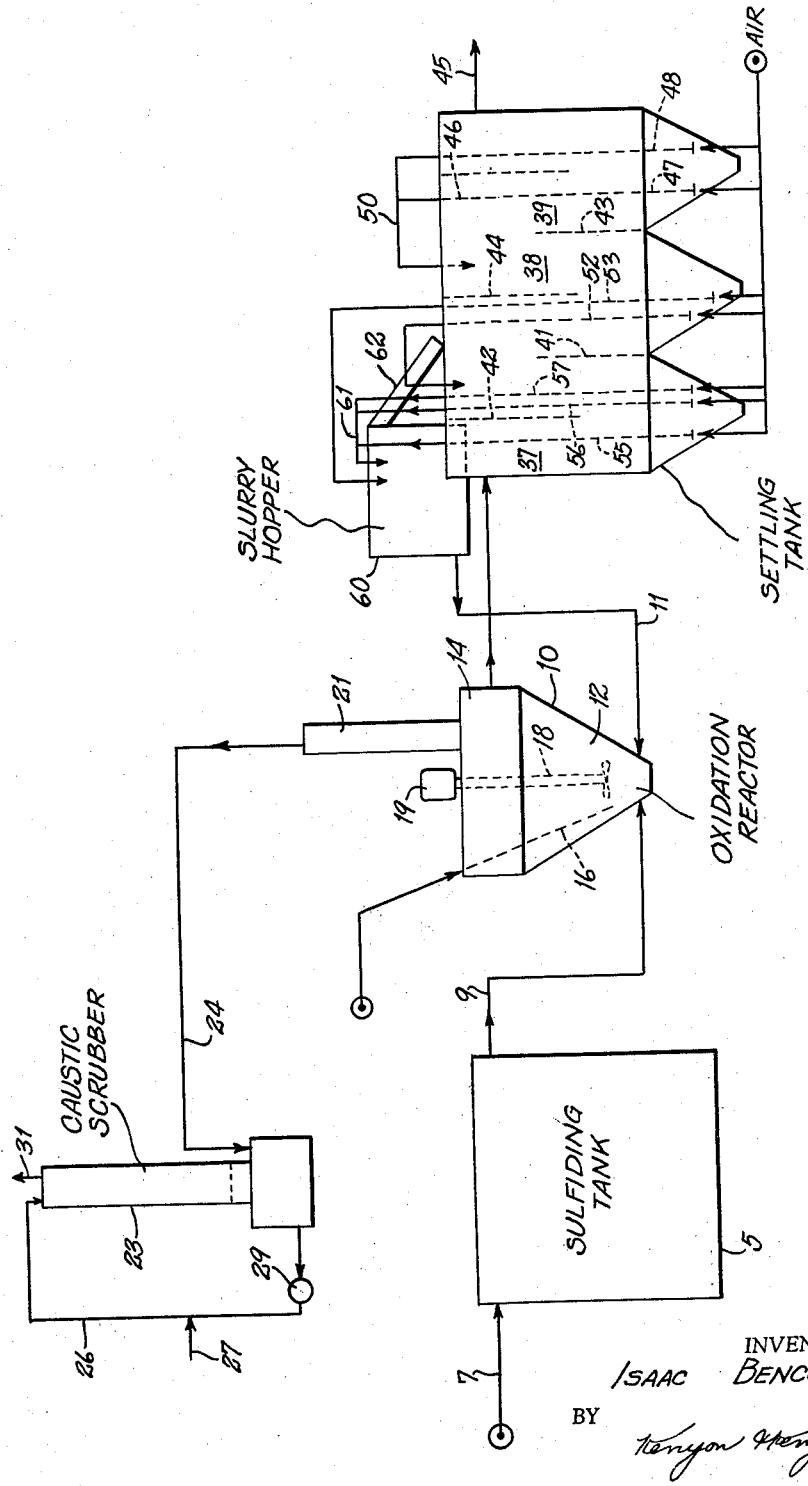
INVENTOR.
ISAAC BENCOWITZ
BY
Kenyon & Kenyon
ATTORNEYS

United States Patent Office

2,897,150
Patented July 28, 1959

2,897,150

PURIFICATION OF WATER

Isaac Bencowitz, Newgulf, Tex., assignor to Texas Gulf Sulphur Company, New York, N.Y., a corporation of Texas Application July 11, 1957, Serial No. 671,325

2 Claims. (Cl. 210—63)

This invention relates to a method of oxidizing oxidizable sulphur compounds and, more particularly, the invention pertains to the oxidation of sulfides in an aqueous medium.

In the Frasch Process for mining sulphur, the discarded water contains appreciable quantities of sulphur compounds which cause air pollution problems and are harmful to marine life and for that reason cannot be discharged into existing rivers or lakes. The discarded water is usually designated as "bleed water" and it contains hydrogen sulfide, sulfides of sodium and calcium, polythionates, thiosulfates, polysulfides, etc. Various techniques have been suggested for treating bleed water to prevent air pollution and to render the sulphur compounds innocuous to marine life, but at present the conventional procedures are not economical.

Extensive investigations were made to determine an economical and efficient procedure for treating the oxidizable sulphur compounds in bleed water in order to render them innocuous. It is reported in the literature that hydrogen sulfide can be reacted with air and sulphur dioxide in the gaseous state at a fairly rapid rate with the use of a suitable catalyst. It is found, however, that this reaction does not proceed to a satisfactory extent, and there is left a water product with appreciable amounts of obnoxious gases. Before this water can be discharged into a body of water containing marine life, a further treatment with alkaline material is needed. The reaction with air and sulphur dioxide was also investigated in the aqueous phase. By this reaction, sulphur compounds in the lower state of oxidation could be converted to higher oxidized states, such as the polythionates. It is found, however, that the polythionates are relatively stable to further oxidation and that they will consume oxygen in water to an undesirable extent. Other methods involving precipitating agents for sulfides and hydrogen sulfides were also investigated. It is found that precipitating reagents containing copper and lead, mercury, silver or iron, will effect substantial removal of the undesirable sulfides and hydrogen sulfides from bleed water, but the cost of this operation is prohibitive for commercialization.

A study of known oxidation methods did not reveal the solution to this problem. For one reason or another, these methods failed. From the standpoint of economics, the oxidation method offered the best possibility for commercial exploitation and for that reason further research was done to develop a satisfactory process. Following extensive research along these lines, quite unexpectedly it was found that bleed water containing oxidizable sulphur compounds could be treated in accordance with the process to be described hereunder in an economical and efficient manner. Accordingly, it is an object of this invention to provide an economical and efficient method for converting a sulfide in water to an innocuous form so that the treated water can be discharged into bodies of water containing marine life.

Another object of this invention is to provide a continuous oxidation method for the treatment of a sulfide in a water medium.

Other objects and advantages of this invention will become apparent from the following description and explanation thereof.

The process of this invention involves treating water containing an oxidizable sulphur compound with oxygen in the presence of a finely divided mass containing hydrous ferric oxide to convert the oxidizable sulphur compound to a product having a low oxygen demand or a compound of higher oxidized state.

More particularly, the present invention is concerned with the treatment of water containing hydrogen sulfide with iron to convert the hydrogen sulfide to iron sulfide and treating the resultant water with oxygen in the presence of a finely divided solid mass containing hydrous ferric oxide to convert the iron sulfide to elemental sulphur and hydrous ferric oxide and then separting water substantially free of hydrogen sulfide from the solid material. Still more particularly, the separated solid material in the form of a slurry is recycled to the oxidation step and thus serves as a catalytic material for the oxidation of hydrogen sulfide. Still more particularly, the bleed water can contain a metal sulfide or polysulfide either alone or in combination with hydrogen sulfide. For this specification and the appended claims, a sulfide is generic to hydrogen sulfide, polysulfide and metal sulfide.

The bleed water being treated in accordance with this invention in general contains about 5 to about 100 grains of oxidizable sulphur compound per gallon of water. The oxidizable sulphur compounds which are present in the bleed water can be hydrogen sulfide, sulfides of calcium and sodium, thionates or polythionates, thiosulfates, polysulfides, etc. The sulfide content is more usually about 5 to 20 grains per gallon and the hydrogen sulfide is about 10 to 50 grains per gallon of water. Additionally, the water may contain optional quantities of sodium chloride in the amount of about 1000 to about 3000 grains per gallon of water. Depending on the source of the water, the calcium carbonate and calcium sulfate content will vary appreciably. Ordinarily, the calcium carbonate content of the water is from about 69 to about 90 grains per gallon of water. The calcium sulfate content is about 132 to about 180 grains per gallon of water. It is advantageous to treat water containing appreciable quantities of calcium carbonate because this salt will precipitate from solution during the treating operation and serve as a carrier for the hydrous ferric oxide which is the catalytic component of the process. While this is advantageous, nevertheless the invention can be practiced with water free of calcium carbonate or calcium sulfate, because elemental sulphur produced in the process serves as an excellent carrier for the hydrous ferric oxide.

By the oxidation treatment, ferrous sulfide is converted to elemental sulphur and iron oxide material containing hydrous ferric oxide. The metal sulfides are oxidized to thiosulfates, which are difficultly oxidized to sulfates. Similarly, the polysulfides are converted to thiosulfates, etc. In the absence of hydrogen sulfide or ferrous sulfide, elemental sulphur is not produced, hence hydrous ferric oxide supported on a carrier material is reused time and again, with periodic replenishment of losses in the water product.

The present invention possesses unique features which are not present in conventional processes. Ordinarily, when hydrogen sulfide is dissolved or dispersed in water, contacting the same with oxygen or air may cause appreciable quantities of hydrogen sulfide to escape before there is a chance for oxidation to occur. In the present invention, a substantial amount or all of the hydrogen sulfide is converted to ferrous sulfide before being contacted with the oxygen containing gas. In this way, the step of converting hydrogen sulfide to ferrous sulfide prevents loss of hydrogen sulfide from the water and supplies iron to the system in a form which can be oxidized to hydrous ferric oxide, the catalyst for the oxidation step.

In the oxidation step, the bleed water containing ferrous sulfide is contacted with an oxygen containing gas, e.g. air under conditions conducive to the formation of elemental sulphur and hydrous ferric oxide. Hydrous ferric oxide per se is not as effective as desired, because it does not offer sufficient surface area for the oxidation reaction. Quite unexpectedly, I found that the elemental sulphur serves as a supporting medium for the hydrous ferric oxide, thus providing large catalytic surface area to the reactants. After the reaction, the solid product materials, including sulphur and hydrous ferric oxide, are separated from the water. The separation is effected by simple settling and decantation, because the particle size of the sulphur product is sufficiently large to make this possible. In the case of water free of hydrogen sulfide, solids other than elemental sulphur can serve as the carrier material for the hydrous ferric oxide. In such cases, the naturally occuring calcium carbonate can be used or any suitable inert metal oxide ordinarily employed as a carrier material.

In the practice of this process involving water containing hydrogen sulfide, it requires time before sufficient catalyst and support are accumulated in the system, but once the slurry is built up, the reaction proceeds smoothly to the desired extent. Due to the physical nature of hydrous ferric oxide, if the material does not deposit on sulphur particles, it is easily lost in the water effluent from the settling zone. However, there is no problem of depleting ferric oxide in the system, because it is being fed continuously in the form of iron sulfide from the sulfiding tank.

In the event that the water feed contains other salts such as calcium carbonate, these may also precipitate during the course of the reaction because as the sulphur compounds are oxidized, the pH increases and thus calcium carbonate is precipitated from solution. Such salts also serve as supporting medium for the hydrous ferric oxide.

The reaction between iron and hydrogen sulfide is conducted at ambient temperature levels. This temperature may be varied to elevated levels, but economics dictate again such practice. In general, a vessel containing junk iron is used, and bleed water is passed through at a rate sufficient to convert a substantial amount or all of the hydrogen sulfide to ferrous sulfide. Usually, about 0.001 to 0.05% of the hydrogen sulfide is reacted.

The water from the sulfiding tank or zone is passed to an oxidation zone where the sulphur compounds, notably the ferrous sulfide, are converted to hydrous ferric oxide and elemental sulphur. In the oxidation of ferrous sulfide, lower oxidized forms of iron oxide are also produced, but ultimately the iron oxide is converted to the useful hydrous ferric oxide. Similarly, analyses show that ferrous sulfide is stepwise converted to other sulfide forms before being converted to an oxide. The history of oxidation is clear from the kinds of iron compounds in the product stream. The oxidation reaction is conducted at ambient temperature level, but this temperature can be varied from about ambient temperature, e.g. 70° F. to 170° F. The quantity of oxygen containing gas, measured as air, is about 0.5 to 2 cubic feet (S.T.P.) per gallon of water. At equilibrium, a slurry of hydrous ferric oxide supported on elemental sulphur and/or calcium carbonate is passed to the oxidation zone at a rate of about ¼ to 1 gallon of slurry per gallon of water. The slurry contains about 5 to 40% solids, of which about 5 to 10% by weight is hydrous ferric oxide, and about 35 to 50% by weight is elemental sulphur. The particle size of the solids in the slurry is in the slime category, i.e. finer than 200 mesh with none in the colloidal range (see Perry's Handbook, 3rd ed., page 939). The pH of the reaction mixture is about 6.5 to 9.0 at 110° F.

After the oxidation reaction, the total effluent from the oxidation zone is allowed to settle in a suitable zone. The settling times vary appreciably, depending upon flow rate and particle size. If desired, other separating means can be used, such as centrifuge, filtration, etc.; however, settling is preferred because it is more economical.

To provide a better understanding of my invention, reference will be had to the accompanying drawing which contains a schematic flow of an illustrative process.

In the drawing, bleed water containing 15 grains hydrogen sulfide per gallon of feed is fed to a sulfiding tank 5 at the rate of 600 gallons per hour by means of line 7. The sulfiding tank is made of concrete having a volume of 144 cubic feet and containing junk or scraps of iron. The temperature of the sulfiding tank is 70–150° F., specifically 80° F. Bleed water has a residence time of 5 minutes in the sulfiding tank where a little of the iron junk is converted to iron sulphide.

The bleed water leaves the sulfiding tank 5 by means of line 9 and flows into an oxidation reactor 10. The reactor 10 has a conically shaped bottom 12 and a cylindrically shaped top portion 14. The bleed water enters the bottom of the conical section 12 wherein it is admixed with air being introduced via line 16 at the rate of ½ cubic feet per gallon of water. The reactor 10 is equipped with a stirrer 18 which driven by a motor 19. A slurry containing hydrous ferric oxide supported on elemental sulphur and $CaCO_3$ is fed into the conical section 12 of the reactor 10 at the rate of ¼–½ gallons per gallon of water feed by means of line 11. The solid content of the slurry has the following composition:

| | Percent by weight |
|---|---|
| Elemental sulphur | 35.80 |
| Ferrous sulfide | 0.10 |
| $FeS_2$ and $Fe_2S_3$ | 7.69 |
| Hydrous Ferric oxide calc. as $Fe_2O_3$ | 8.10 |
| Calcium carbonate | 48.10 |

The particle size of the finely divided solids is of the slime type but not colloidal. The reactor has a volume of 12.6 cubic feet and the bleed water has a residence time of 9.5 minutes in the reactor. The temperature in the reactor is 110° F. Any gaseous material in the reactor is discharged therefrom by means of vent 21. Should any hydrogen sulfide be present in this gas, provision is made for its removal by passing the same through a packed tower 23 via line 24. A caustic solution is fed to a recirculation line 26 by means of line 27 at the rate of 1.5 gallons per minute. The recirculation line contains a suitable pump 29 for passing caustic solution from the bottom of the packed tower to the top thereof. The residual gas material is discharged from the top of tower 23 by means of line 31. Under steady state conditions, the caustic scrubbing tower 23 is not needed, because sufficient hydrogen sulfide reacts with iron to eliminate the need for disposal.

The effluent from reactor 10 is passed to a settling tank 35. The settling tank consists of three compartments 37, 38 and 39, separated from each other by means of baffles or partitions 41 and 43. Baffles 42, 44 and 46 in zones 37, 38 and 39, respectively, depend midway thereof and in conjunction with baffles 41 and 43 form a tortuous line of travel for the slurry. The reaction product enters the top of zone 37 and flows from left to right through zones 38 and 39, depositing solids on the way. Treated water substantially free of solids is discharged from the settling tank 35 via line 45. Simultaneously solids or slurry is passed from right to left from zone 39 to zone 37 by means of a series of air lifts in each zone. Air lifts 47 and 48 lift solids from the bottom of zone 39 and pass the same to zone 38 by means of line 50. Solids are picked up from the bottom of zone 38 by means of air lifts 52 and 53 and passed to zone 37 and hopper 60, respectively. In turn, solids are picked up from the bottom of zone 37 and by means of air lifts 55, 56 and 57 and passed to a slurry hopper 60 by means of line 61 wherefrom the slurry is fed to the reactor 10 via line 11. The bleed water product has a residence time of 10 hours in the settling tank 35. An overflow chute 62 is provided to accommodate overflow from the slurry hopper 60 and thus assists in maintaining a constant slurry rate to the reactor 10.

The use of air lifts serves an additional purpose in connection with this invention. In the event that the oxidation reaction is not completed in the reactor 10, enough oxygen is supplied in the settling tank 35 to complete the reaction. Further, it is noted that the recycled slurry may contain sufficient oxygen to eliminate supplying the same through line 16, as the amount of oxygen and residence time in the settling zone are adequate to effect the required oxidation.

Having thus provided a written description of my invention along with specific examples thereof, it should be understood that no undue limitations or restrictions are to be imposed by reason thereof.

I claim:

1. A process which comprises passing a water stream containing hydrogen sulfide, calcium sulfide, sodium sulfide, polythionates, thiosulfates, and polysulfides to a zone containing iron and thus producing an iron compound containing sulphur, passing the water stream containing the iron compounds to an aeration zone, passing a recycled slurry of hydrous ferric oxide supported on elemental sulphur to the aeration zone, passing an oxygen containing gas to the aeration zone, thereby converting the iron compound to a reaction product containing hydrous ferric oxide and elemental sulphur, separating a water product substantially free of the iron compound from the reaction product, separating a slurry of hydrous ferric oxide supported on elemental sulphur from the reaction product and recycling at least part of the slurry to the aeration zone.

2. A process which comprises passing a stream containing hydrogen sulfide, calcium sulfide, sodium sulfide, polythionates, thiosulfates, and polysulfides to a zone containing iron and thus producing an iron compound containing combined sulphur, the water stream containing about 5 to 100 grains of oxidizable sulphur compound per gallon of water, passing the water stream containing the iron compound to an aeration zone, passing about one-quarter to one gallon of recycled aqueous slurry containing hydrous ferric oxide supported on elemental sulphur per gallon of water to the aeration zone, said slurry containing about 5 to 40% solids of which about 5 to 10% is hydrous ferric oxide and about 35 to 50% is elemental sulphur, passing an oxygen containing gas to the aeration zone at a rate of about 0.5 to 2 cubic feet per gallon of water, the pH of the reaction mixture in the aeration zone is about 6.5 to 90 at 110° F., thereby producing a reaction product containing additional hydrous ferric oxide and elemental sulphur, separating a water product substantially free of the iron compound from the reaction product, separating an aqueous slurry of hydrous ferric oxide supported on elemental sulphur from the reaction product, and recycling at least part of the separated slurry to the aeration zone.

References Cited in the file of this patent

UNITED STATES PATENTS

| | | |
|---|---|---|
| 1,983,399 | Ramsburg | Dec. 4, 1934 |
| 2,641,571 | Lentz | June 9, 1953 |

FOREIGN PATENTS

| | | |
|---|---|---|
| 190,131 | Great Britain | Feb. 27, 1924 |

UNITED STATES PATENT OFFICE
CERTIFICATE OF CORRECTION

Patent No. 2,897,150                                                     July 28, 1959

Isaac Bencowits

It is hereby certified that error appears in the printed specification of the above numbered patent requiring correction and that the said Letters Patent should read as corrected below.

Column 6, line 21, for "6.5 to 90" read -- 6.5 to 9.0 --.

Signed and sealed this 15th day of December 1959.

(SEAL)
Attest:

KARL H. AXLINE
Attesting Officer

ROBERT C. WATSON
Commissioner of Patents